US007151353B2

(12) United States Patent
Bosga et al.

(10) Patent No.: US 7,151,353 B2
(45) Date of Patent: Dec. 19, 2006

(54) SWITCHING DEVICE

(75) Inventors: Sjoerd G. Bosga, Västerås (SE); Philip C. Kiaer, Västerås (SE); Magnus Backman, Västerås (SE); Mats Svensson, Borlänge (SE); Per-Olof Thureson, Grängesberg (SE); Lars Jonsson, Västerås (SE); Freddy Magnussen, Västerås (SE); Per Larsson, Västerås (SE); Stefan Valdemarsson, Lidköping (SE)

(73) Assignee: ABB AB, Västerås (SE)

( * ) Notice: Subject to any disclaimer, the term of this patent is extended or adjusted under 35 U.S.C. 154(b) by 514 days.

(21) Appl. No.: 10/380,622

(22) PCT Filed: Sep. 17, 2001

(86) PCT No.: PCT/SE01/01985

§ 371 (c)(1), (2), (4) Date: Jul. 7, 2003

(87) PCT Pub. No.: WO02/23571

PCT Pub. Date: Mar. 21, 2002

(65) Prior Publication Data

US 2004/0100741 A1 May 27, 2004

(30) Foreign Application Priority Data

Sep. 18, 2000 (SE) ................................. 00033712

(51) Int. Cl.
*G05B 19/10* (2006.01)

(52) U.S. Cl. .......................... 318/567; 318/9; 318/560; 318/563; 318/569

(58) Field of Classification Search ................ 318/567, 318/9, 560, 563, 569; 361/93; 200/61.54
See application file for complete search history.

(56) References Cited

U.S. PATENT DOCUMENTS

| | | | | |
|---|---|---|---|---|
| 3,655,930 A | | 4/1972 | Frey | |
| 3,813,507 A | | 5/1974 | Kesselring | |
| 4,122,318 A | * | 10/1978 | Tashiro et al. | 200/61.54 |
| 4,359,616 A | | 11/1982 | Ueda et al. | |
| 5,151,567 A | | 9/1992 | Thuries | |
| 5,162,627 A | | 11/1992 | Dufournet et al. | |
| 5,740,002 A | * | 4/1998 | Jenss et al. | 361/93.9 |
| 5,754,386 A | | 5/1998 | Barbour et al. | |

FOREIGN PATENT DOCUMENTS

DE 1142026 1/1963

(Continued)

*Primary Examiner*—Karen Masih
(74) *Attorney, Agent, or Firm*—Venable LLP; Eric J. Franklin

(57) ABSTRACT

A method for evaluating a condition of a switching device. The switching device includes contact parts, an electric motor and a mechanical coupling device for transforming motion from the electric motor to at least one of the contact parts. A self-diagnostic test is performed on a component of the switching device. The test includes making at least one small movement with the electric motor. A switching device includes contact parts, an electric motor, a mechanical coupling device for transforming motion from the electric motor to at least one of the contact parts, and tester for making self-diagnostic tests, wherein the tester makes small motor movements that are a fraction of a full breaking movement, thereby producing data for evaluating a condition of the switching device.

6 Claims, 2 Drawing Sheets

FOREIGN PATENT DOCUMENTS

| | | |
|---|---|---|
| DE | 3224165 | 12/1983 |
| DE | 1981742 | 10/1999 |
| EP | 0475247 | 3/1992 |
| FR | 2019610 | 7/1970 |
| FR | 2152560 | 4/1973 |
| FR | 2661549 | 10/1991 |
| GB | 1273014 | 5/1972 |
| WO | WO 9636982 | 11/1996 |
| WO | WO 9952121 | 10/1999 |
| WO | WO 0013283 | 3/2000 |
| WO | WO 0036621 | 6/2000 |

* cited by examiner

SWITCHING DEVICE

CROSS-REFERENCE TO RELATED APPLICATIONS

This application claims priority to Swedish patent application 0003371-2 filed 18 Sep. 2000 and is the national phase under 35 U.S.C. § 371 of PCT/SE01/01985.

FIELD OF INVENTION

The present invention relates to a method for testing, controlling and regulating a switching device with contact parts, to a switching device and to a computer program therefore. The switching device comprises an electric motor and a mechanical coupling device for transforming motion from the electric motor to at least one of the contact parts. The switching device may comprise one or more electric motors and one or more mechanical coupling devices for transforming motion from each electric motor to at least one of the contact parts. Position, speed and/or acceleration of the at least one contact part are obtained, and position, speed and/or acceleration of the at least one contact part during operation are controlled during operation. The method and the switching device are particularly intended for application in medium and high voltage networks.

PRIOR ART

Traditionally, operating of switching devices is performed by use of spring mechanisms with enough energy to obtain opening and closing of switching device. In a classical spring operating mechanism OPEN and CLOSE signals are the only real-time signals present. Spring mechanisms do not perform exactly the same operational time from one opening/closing operation to another. Therefore, the time delay from order to completed operation is not constant. It is not possible to control and regulate the motion and position of the contact parts in an exact way. Communication in a system with a traditional spring switching device includes tripping coils. There are also necessary with 110V links and relays for communication.

In a switching device using a spring mechanism, the spring will apply the same force on the contact part at every operation, so it has to be designed to operate as if a worse case current were to be interrupted at every operation. In a spring mechanism, the time delay is not constant. Spring mechanisms provide only position information with a very limited resolution. In a spring mechanism system external measurement equipment must be connected to collect information regarding th operation of spring mechanism, and must remain connected during all switching device operation s from which one wants to obtain information. In practice this means that to test a switching device, it must be taken out of service, measuring equipment must be connected and some operations must be performed.

In order to overcome the drawbacks related to a spring operated switching device it has been suggested to use an electric motor for operating the mobile contact part. WO 00/136,621 discloses an example of this type of switching device.

According to WO 00/136,621 the movement of the mobile contact part is controlled. A control unit receives input information, which information includes information about the network condition, the movement of the mobile contact part, the movement of the rotor of the electric motor and/or instructions for an operator. Based on this information the control unit controls the motor movement by controlling the current supplied thereto. The movement follows a motion profile stored in the control unit and the movement is adapted to the feedback information from the input.

This known device represents an important improvement in relation to a spring operated switching device since it offers a much higher degree of control of the motion. However, the known device is not flexible enough to obtain an optimal operation of the mobile contact part.

SUMMARY OF INVENTION

The object of the present invention therefore in a first aspect is to improve the method of controlling and regulating a switching device so as to achieve a motion of the mobile contact part that is optimised with respect to timing and motion profile of the mobile contact part.

The obtained information about the motion of the mobile contact part thus is used not only for the control of the contact part but is also logged and stored. Comparison of actual log entries with factory log entries gives a direct indication on whether the switching device still performs as when it was commissioned. The stored information may also allow observing trends and possibly predicting failures. By storing this information, each operation delivers information that is useable for every subsequent operation of the switching device. The information is processed in order to adjust for any deviation from the optimal behaviour in the previous operation so that an updated control is achieved. This allows control to be more accurate. By the invented method the control of a switching device operation becomes more intelligent since information about a present operation as well as a previous operation contributes to the control.

In a preferred embodiment of the invented method position, speed and/or acceleration of the at least one contact part are controlled adaptively in real-time.

In another embodiment of the invented method when a rotary motor is used, position, speed and/or acceleration of contact parts are obtained from rotor position and/or speed. Since the rotor is mechanically coupled to the mobile contact part data relating to the rotor motions are directly indicative of the corresponding motions of the mobile contact part. To obtain these data from the rotor is a very convenient and simple way of determining the motions of the mobile contact part. Detection of whether or not a switching device has started its motion will be obtained already after about 5 ms after reception of opening/closing order. This is used to send an order to another switching device in case the first switching device is not responding to an order.

In another embodiment, control of position, speed and/or acceleration of the mobile contact part is performed by controlling the position, speed and/or acceleration of the rotor. As in the embodiment mentioned above this takes advantage of the direct relationship between the rotor motion and the mobile contact part motion that is established by the mechanical coupling.

In yet another embodiment, control and regulation of position, speed and/or acceleration of the at least one contact part during operation are controlled during operation in accordance with the specific current to be interrupted. The required energy for operation of the switching device and the position, speed and/or acceleration of the contact parts are adapted to the present current, e.g. a short circuit current, a capacitive or inductive current or a normal load current. Using information about the specific characteristics of the current to be interrupted when controlling the motion is particularly advantageous, since the characteristics of the current affect the way it should be interrupted. The motion profile thus by this embodiment is adapted accordingly.

In yet another embodiment position, speed and/or acceleration of the at least one contact part is controlled during operation to obtain contact parts position, speed and/or acceleration synchronised with zero crossing of current through the switching device. It is important that a breaking operation and in particular the separation of contact parts occur at a predetermined time relation to zero crossing of the current to be interrupted.

In yet another embodiment, position, speed and/or acceleration of the at least one contact part is controlled during operation to obtain contact parts position, speed and/or acceleration synchronised with voltage across the switching device.

Fast communication allows continuously sending the exact desired opening/closing instant to the motion control. The desired instant is thus updated even after the contact part motion has started, allowing more accurate prediction and thus improved synchronisation.

In yet another embodiment, information regarding events and failures are stored in an event/failure log.

In yet another embodiment, characteristic parameters from operations are stored in an operations log.

In yet another embodiment, parameters for the contact parts position, speed and acceleration, the rotor position, speed and/or acceleration, the energy required for operation and the temperature in the switching device during operation are stored in the operations log.

In yet another embodiment, parameters for the voltage across and current through the switching device during operations are stored in the operations log.

In yet another embodiment, detailed data from the last switching device operation are stored in a last-operation log.

In yet another embodiment, the contact parts position, speed and/or acceleration, the rotor position, speed and/or acceleration, the energy required for operation and the temperature during the last operation are stored as functions of time in the last-operation log.

In yet another embodiment, voltage across and current through the switching device during the last operation are stored as functions of time in the last-operation log.

In yet another embodiment, voltage across and current through th switching device between and during operations are stored in a long-time log.

In a second aspect of the invention the objects is achieved in that a method according to the present invention. The use of an electric motor for operating the mobile contact part makes such tests very easy and reliable to perform. The tests contribute to attain an accurate control since it can be based on information from the tests.

The object of the present invention in a third aspect is to improve a switching device of the known kind of as described above so as to achieve a switching device in which the motion of the mobile contact part is optimised, with respect to timing and motion profile.

In a preferred embodiment of the method for evaluating the condition of the switching device, self-diagnostic test is performed on the switching device by making small motor movements. The method offers the possibility to supervise the function of the switching device. Since a switching device normally is inactive during its lifetime and operates only during a few short moments there is always a degree of uncertainty whether the switching device is properly ready for operation. By initiating a short motor movement sufficient data for evaluating the condition of the switching device is obtained when controlled according to the present invention. By such a test, information is obtained about the function of the rotor positioning system, the function of a converter when such is present, the function of the motor, the function of the contact parts, the capacity of the electrical storage means, etc. The small movement is only a fraction of a full breaking movement, which means less than a $10^{th}$ thereof or even less than a $20^{th}$ thereof and typically in the range of a few millimetres for a switching device operating on a medium or a high voltage system. The contact parts thus are never separated during these tests.

In yet another embodiment, self-diagnostic test is performed on storage means for storage of electrical energy for the breaking operation by slightly charging or discharging said storage means. Advantage is taken of the possibility offered by the invented method to also check the condition of the electric storage means. Data obtained by this slight charging or discharging informs whether the storage means is ready for operation.

Self-diagnostic test may be performed either as a result of an external order or as a result of triggering by an internal condition. The tests according to the embodiments described closest above and other similar tests, which the present invention makes possible, are advantageously initiated by external order. Such orders are given when it is considered relevant to check the status or are given at regular intervals. In the latter case ordering is performed automatically. Another advantageous alternative is to initiate such tests in response to internal conditions of the switching device. In such a case the tests are automatically performed when internal conditions indicate that there might be risk for defective performance. These two advantageous alternatives for initiating tests therefore represents further embodiments of the invention. It is to be understood that the embodiments not only are alternatives. The embodiments can also be combined.

In yet another embodiment a processor is used for processing obtained information and/or providing relevant instructions. The processor operates according to a computer program. Thereby control and regulation is performed with optimised efficiency. The switching device is small in size and cheap to manufacture. The embodiment also makes it easy to amend the way in which control is performed in response to obtained information.

According to the third aspect of the invention this is achieved with a switching device. The switching device offers the possibility to control the motion of the mobile contact part according to the present method. The switching device therefore offers the corresponding advantages as have been described above regarding the method.

In a preferred embodiment, control means is control means for adaptive control of position, speed and/or acceleration of the at least one contact part during operation in real-time.

In another embodiment, the switching device according to the present invention comprises record means for obtaining position, speed and/or acceleration of contact parts from rotor position, speed and/or acceleration.

In another embodiment, the switching device according to the present invention comprises control means for control of position, speed and/or acceleration of contact parts from rotor position, speed and/or acceleration.

In yet another embodiment, means for storage of electrical energy is a capacitor bank and/or a battery.

In yet another embodiment, the switching device comprises means for control of position, speed and acceleration of contact parts during operation in accordance with the specific current to be interrupt.

In yet another embodiment, the control means is arranged to obtain separation of contact parts at breaking operation synchronised with zero crossing of current through the switching device.

In yet another embodiment, the control means is arranged to obtain contact part meeting at closing operation synchronised with voltage across the switching device.

In yet another embodiment, the switching device comprises means for logging and storing characteristic parameters from operations in an operations log. In yet another embodiment said parameters include parameters for the contact parts position, speed and/or acceleration, the rotor position, speed and/or acceleration, the energy required for operation and the temperature during operation in the operations log.

In yet another embodiment said parameters include parameters for the voltage across and current through the switching device during operations in the operations log.

In yet another embodiment, the switching device comprises means for logging and storing detailed data from last switching device operation in a last-operations log.

In yet another embodiment, the switching device comprises a converter, said data include data as functions of time and being related to the contact parts position, speed and acceleration, the rotor position, speed and acceleration, the operation of converter, the energy required for operation and the temperature in the switching device.

In yet another embodiment said data include data for the voltage across and current through the switching device during the last operation as functions of time.

In yet another embodiment, the switching device comprises means for storing data for the voltage across and the current through the switching device between and during operations in a long-time log. The above described preferred embodiments of the invented switching device have advantages of the same kind as those related to corresponding preferred embodiments of the invented method and which has been described in relation thereto.

Yet another embodiment of the switching device includes a processor and a computer program product. The processor is arranged to process information related to the switching device and/or provides instructions to the switching device. The processor operates according to the computer program of a computer program product. Providing the switching device with these components makes it easy to perform the control, and the size and cost for the switching device are reduced. The control process can easily be modified by amendments to the computer program.

In a fourth aspect of the invention the object is achieved with a switching device. By providing such test means advantages are attained of similar kind as those related to the invented method for evaluating the condition of a switching device and which has been described above.

Preferred embodiments of a switching device according to the fourth aspect of the invention offer advantages of similar kinds as those of the preferred embodiments of the corresponding invented method.

In a fifth and a sixth aspect of the invention, it relates to a computer program product, and a computer readable medium respectively. The computer program product and the computer readable medium include the invented computer program. The invented computer program includes instructions for a processor to perform the method and/or is to be used in a switching device according to the present invention. The invented computer program product and the invented computer readable medium represent different aspects of a vital component for performing the method according to the present invention. As a consequence, they also represent a vital component of the switching device according to the present invention.

BRIEF DESCRIPTIONS OF DRAWINGS

DETAILED DESCRIPTIONS OF PREFERRED EMBODIMENTS

The invention claimed will now be described in detail with references to the accompanying drawings.

Figure 1:
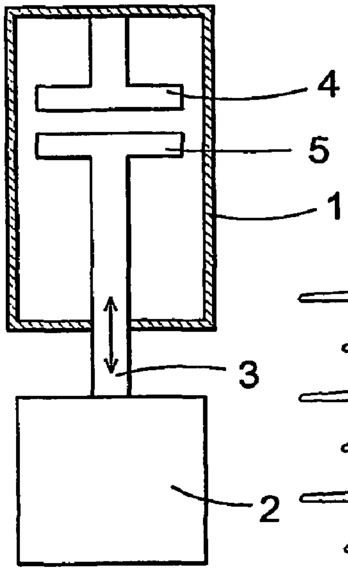
FIG. 1 shows the principle of an electric switching device.

FIG. 1 schematically illustrates the principle of an electric switching device. It consists of a breaking chamber 1, actuating means 2 and an actuating rod 3. In the breaking chamber there is provided a stationary contact part 4 and a mobile contact part 5. Each contact part is connected to a conduct respectively. Under normal conditions the two contact parts 4, 5 are in contact with each other and current flows from the one contact part to the other through the switching device. When the current for some reason is to be interrupted, e.g. due to fault short circuit currents, the mobile contact part 5 moves away from the stationary contact part at high speed. Thereby initially an electric arc develops between the contact parts, which arc is extinguished shortly after contact part separation by means of an insulation gas. When the current thereafter is to be closed the mobile contact part 5 is displaced towards contact with the stationary contact part again. Initiating of the movement is performed manually or automatically. Breaking and closing of the switching device is attained through the actuating rod 3 connected to the mobile contact part and to drive means in the actuating unit. This general construction of a switching device is common to different types thereof and it is realised in many different ways. In the figure a lot of details normally present in a switching device are left out. This for the sake of clarifying the working principle as such. The following description relates primarily to detail 2 of th figure, i.e. the actuating means. In the figure the actuating means have been illustrated as a unit separated from the breaking chamber although in practice they are arranged as a common unit.

Figure 2:
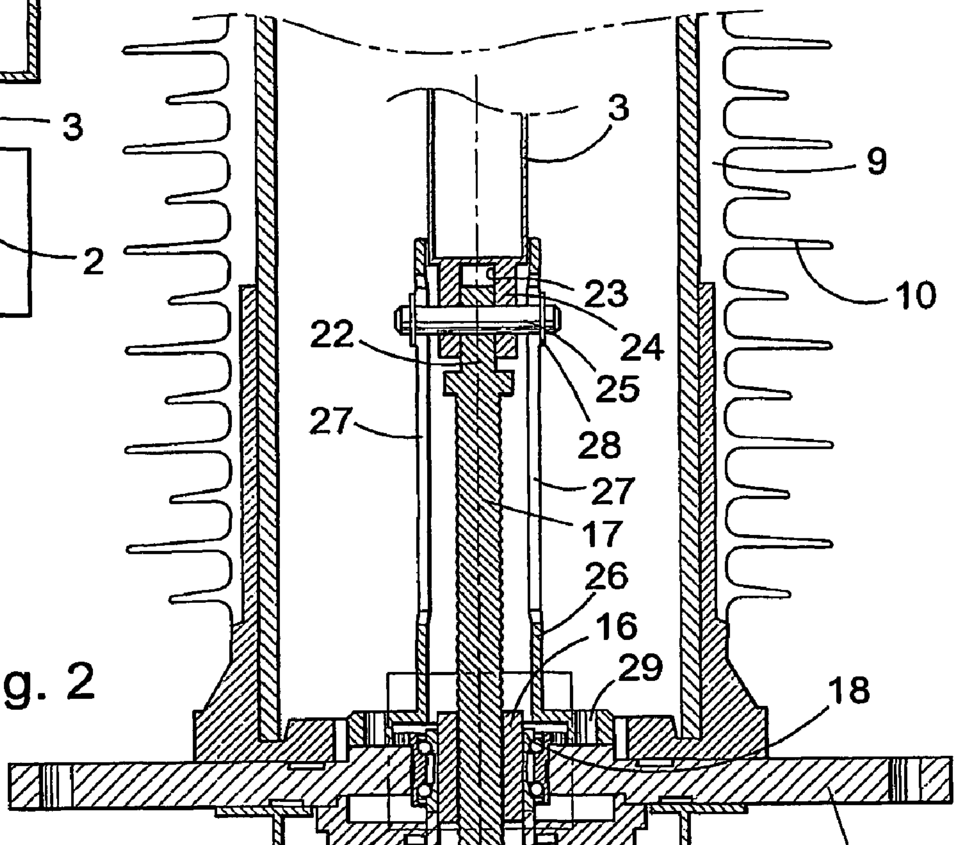
FIG. 2 shows a first embodiment of the actuating means of a switching device of a kind similar to that described in connection with FIG. 1.
Figure 2:
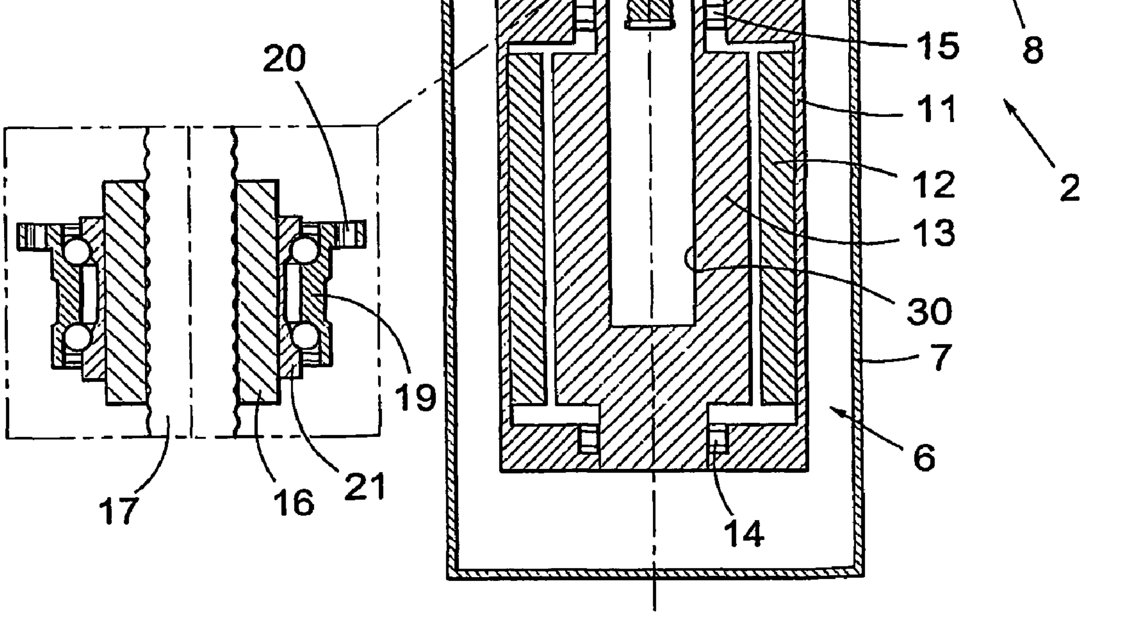

FIG. 2 illustrates a first embodiment of the actuating means 2 of a switching device of a kind similar to that described in connection with FIG. 1. The actuating means includes an electric motor 6 comprising a stator 12 and a rotor 13 enclosed by a hood 7. One end of the hood 7 is attached to a mounting plate 8, which is carried by a support, e.g. by means of bolts through borings 9 in the plate 8. From the side of the plate facing away from the motor a post 9 of insulating material e.g. porcelain extends upwards in the figure. The insulation post 9 is provided with flanges 10 on its exterior to attain an increased creep distance. Inside the insulation post the actuating rod is arranged. In the upper end, not shown, of the insulation post the breaking chamber is housed and its mobile contact part is rigidly connected to the actuating rod 3. The actuating rod 3, the insulation rod and the motor 6 are all coaxial.

A motion transforming mechanism is provided for transforming the rotary motion of motor rotor 13 to translatory motions of the actuating the rod 3 in order to open or close the switching device in accordance with what has been described in connection to FIG. 1. The motion transforming mechanism will be described more in detail in the following.

In the motor casing 1 the rotor 13 of the motor is journalled by a bearing 14,15 at each end of the rotor. The stator 12 of the motor is attached to the motor casing 1 and the motor housing in attached to the mounting plate 8. The rotor 13 has a central axial boring 30 extending along the major part of the rotor length. The mounting plate 8 has an opening coaxial with the motor shaft in which opening a nut 16 is journalled for rotation in a double acting angular contact ball bearing 18. The outer ring 19 of the bearing 18 is attached to the mounting plate 8 by bolds, not shown, in borings 20 extending through a flange on the outer ring. An inner ring 21 of the bearing is rigidly connected to a nut 16. The inner ring 21 is also rigidly connected to the rotor 13.

A screw 17 extends through the nut, i.e. a rod having threads. The threads of the nut 16 and the screw 17 co-operate in engagement with each other. Relative rotation between them thus results in that the screw is axially displaced in relation to the nut. The end of the screw 17 that is remote from the motor, i.e. the upper end in the figure is connected to the actuating rod 3 of the switching device. This is accomplished in that th upper end of the screw extends into a boring 23 in the lower end 24 of the actuating rod. The connection is received by diametrically arranged pin 25 extending through the ends of the screw and the actuating rod.

From the mounting plate 8 a guiding sleeve 26 extends enclosing the screw 17. The guiding sleeve has diametrically located axially extending guide tracks 27. The pin 25 extends out through each guide track 27 and is provided with a locking washer 28 at each end. The guiding track 27 has a width corresponding to the diameter of the pin 25. Thereby the screw 17 is secured against rotation in relation to the guiding sleeve 26. The guiding sleeve 26 also is secured against rotation in that it is attached to the mounting plate 8 by means of not shown bolts through the borings 29. The guiding sleeve 26 has an inner diameter such that the actuating rod 3 with small clearance is inserted therein.

Thus, as the nut 16 by its journalling is axially fixed and the screw 17 by the arrangement described above is fixed against rotation it follows that rotational motion of the nut results in that the screw is forced to move axially.

FIG. 2 shows the switching device in its normal position when it is in closing position. When the switching device is to be activated to interrupt the current the motor is started so that its rotor 13 starts to rotate clockwise as seen from above in the figure. This forces the screw to move clockwise where through the mobile contact part 5 (see FIG. 1) is withdrawn from contact with the stationary contact part. The central boring 30 has a length giving space enough for the screw to be displaced a sufficient distance for completing breaking. During the breaking operation the lower part of the actuating rod will slide downwards in the guiding sleeve 26.

When breaking is completed the motor is stopped and now the lower end of the screw 17 is located closed to the bottom of the boring 30. The pin 26 now is located at the lower end of the guiding track 27. When the switching device later is to be reset, the motor is started but with rotation in the opposite direction, so that the screw 17 and therewith the actuating rod moves upwards until the mobile contact part 5 again contacts the stationary contact part, and the components of the device will again have the position shown in FIG. 2.

The transformation of the rotary motion of the motor to translatory motion accomplished by actuating means of course can be arranged in many other ways than the one described in connection to FIG. 2 Furthermore it is not always necessary to transform the motion. There is also the possibility that the mobile contact part at breaking or closing performs a rotary motion as well as the alternative where there is translatory motion of the mobile contact part and the driving is attained by a linear motor. In the embodiment depicted in FIG. 2 the nut is connected to the rotor and the screw to the mobile contact part. In some cases the inverse relation is preferred, i.e. the screw is connected to the rotor and the nut to the mobile contact part. The screw thus relates together with the rotor and the nut is forced to translatory motion by its mash with the screw. Such an embodiment offers the advantage that the mass that is to be accelerated to a translatory motion becomes much smaller than in the embodiment according to FIG. 2.

Figure 3:
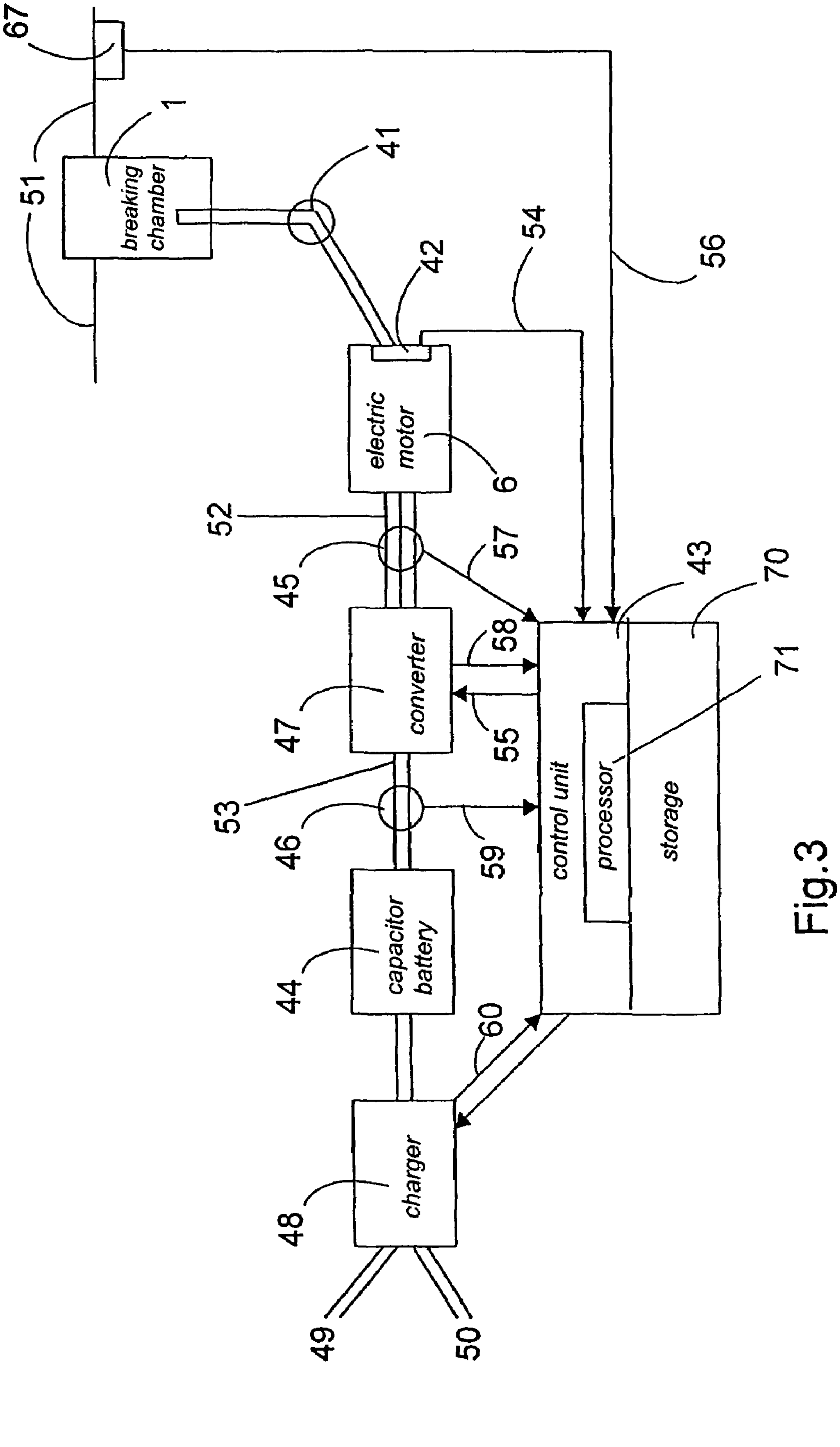
FIG. 3 shows a block diagram of a switching device according to the present invention.

FIG. 3 is a block diagram showing an example of a switching device according to the present invention. It comprises a breaking chamber 1 with contact parts 4, 5. The switching device operates on a line 51 of an electric network, and each contact part 4, 5 is connected to a respective part of the line 51. One of the contact parts is mobile and is mechanically connected to an electric motor 6 through a mechanical coupling device 41 for transforming rotary motion of the electric motor to translatory motion of the mobile contact part 5. The arrangement of the breaking chamber, the mechanical coupling device and the electric motor can be as illustrated in FIGS. 1 and 2, but other arrangements can be used of course.

The electric motor 6 is connected by an electric coupling 52 to a converter 47. The converter 47 is connected by an electric coupling 53 to a capacitor bank 44. Electric energy for operating the switching device is supplied from the capacitor bank 44 to the converter 47. The converter converts the electricity and supplies it to the electric motor 6. The capacitor bank is charged by a charger 48 connected to a network supply 49 or a battery supply 50.

A control unit 43 controls the operation of the switching device. The control unit is arranged to obtain information related to the switching device and to provide control signals for its operation. A plurality of signal lines thus connects the control unit 43 with other parts of the switching device. A first signal line connects the control unit with a record means 42 in the electric motor 6. The record means 42 is connected to the rotor of the electric motor to obtain data about its motion. These data can be position, speed or acceleration or a combination thereof. Since the movement of the rotor is transferred to th mobile contact part 5, the data of the rotor motion are indicative of the corresponding data of the mobile contact part 5.

Through a second signal line 55, the control unit 55 sends control signals to the converter 47, for controlling the operation of the electric motor 6. By the control signals, the converter 47 governs the motion of the electric rotor such as its position, speed and/or acceleration, and thereby the corresponding motion of the mobile contact part 5. The control signals are produced in response to the signals obtained from the record means 42 through the first signal line 54. By means of the control unit, the operation of the switching device thus is adaptively controlled in real-time.

Associated with the control unit 43, a storage means 70 is provided. In this storage means 70, measurements and events related to the switching device is logged and stored.

A third signal line 56 connects the control unit 43 with a measuring unit 57 in the line 51, on which the switching device operates. The measuring unit is arranged to measure the current in line 51 and the voltage across the switching device. Information on these measurements is sent to the control unit 43 through the signal line 56. This information also affects the control signals from the control unit 43 to the converter 47 and therethrough the operation of the switching device. The information signals from the measuring unit 57 are also used to synchronism the operation of the switching device with the current and/or the voltage. At breaking operation, the switching device can be synchronised so that contact part separation occurs at zero crossing of the current or at a predetermined time relation to zero crossing. At closing, the switching device can be synchronised so that contact part meeting occurs at a predetermined moment in the voltage cycle.

Further inputs to the control unit are formed by fourth 67, fifth 58, sixth 59 and seventh 60 signal lines from various components of the switching device. Through the fourth signal line 67, signals are received from a current measuring unit 45 in the electric coupling 52 between the converter 47 and the electric motor. Through the fifth signal line 58, signals are received from the converter 47, which signals are representative of conditions in the converter, e.g. its temperature. Through the sixth signal line 59, signals are received from a voltage measuring unit 46 in the electric coupling 53 between the capacitor battery 44 and the converter 47. Through the seventh signal line 60, signals are received from the charger 48.

All information from the different signal lines can be logged and stored in the storage means 70 associated with the control unit 43. The storage means includes a plurality of logs, namely an operations log, an event/failure log, a last-operation log and a long-time log. The logs thus contain information on measurements, events and failures in the switching device and include operation parameters, such as contact parts position, speed and acceleration, rotor position, speed and acceleration, energy required for operation, temperature in the switching device during operation, voltage across and current through the switching device, data from the converter.

In the logs, information regarding self-diagnostic tests of the switching device can be stored as well.

The switching device is further provided with a processor 71, operating according to a computer program of a computer program product such as a computer readable medium. The computer program provides instructions to the processor 71 on how the information obtained from the different sources via the signal lines is to be processed in order to create control signals from the control unit 43 for the operation of the switching device. The program also provides instructions on how the stored information affects the processing.

The invention claimed is:

1. A method for evaluating a condition of a switching device, said switching device comprising contact parts, an electric motor and a mechanical coupling device for transforming motion from the electric motor to at least one of the contact parts, the method comprising:

performing a self-diagnostic test on a component of the switching device, the test comprising making at least one small movement with the electric motor that is a fraction of a full breaking movement, thereby producing data for evaluating a condition of the switching device.

2. The method according to claim 1 wherein the switching device further comprises storage means for storage of electrical energy for operation of the switching device, and wherein the test further comprises slightly charging or discharging said storage means.

3. The method according to claim 1, wherein the test is performed as a result of an external order or as a result of triggering by an internal condition.

4. A switching device, comprising:

contact parts, an electric motor, a mechanical coupling device for transforming motion from the electric motor to at least one of the contact parts, and test means for making self-diagnostic tests, wherein the test means comprises means for making small motor movements that are a fraction of a full breaking movement, thereby producing data for evaluating a condition of the switching device.

5. The switching device according to claim 4, further comprising:

storage means for storage of electrical energy for operation of the switching device, wherein the means for making self-diagnostic tests includes means for slightly charging or discharging said storage means.

6. The switching device according to claim 4, further comprising:

means for initiating of self-diagnostic test as a result of an external order and/or as a result of an internal condition.

* * * * *